(12) United States Patent
Dahl

(10) Patent No.: US 11,255,395 B2
(45) Date of Patent: Feb. 22, 2022

(54) COMPACT SPATIAL ELLIPSOIDAL MASS PENDULUM

(71) Applicant: Burkhard Dahl, Oberhausen (DE)

(72) Inventor: Burkhard Dahl, Oberhausen (DE)

( * ) Notice: Subject to any disclaimer, the term of this patent is extended or adjusted under 35 U.S.C. 154(b) by 109 days.

(21) Appl. No.: 16/464,637

(22) PCT Filed: Nov. 28, 2017

(86) PCT No.: PCT/EP2017/080623
§ 371 (c)(1),
(2) Date: May 28, 2019

(87) PCT Pub. No.: WO2018/099896
PCT Pub. Date: Jun. 7, 2018

(65) Prior Publication Data
US 2019/0346003 A1 Nov. 14, 2019

(30) Foreign Application Priority Data

Nov. 29, 2016 (DE) ...................... 10 2016 122 999.7

(51) Int. Cl.
*E04H 9/02* (2006.01)
*F16F 7/10* (2006.01)

(52) U.S. Cl.
CPC ............. *F16F 7/10* (2013.01); *E04H 9/0215* (2020.05)

(58) Field of Classification Search
CPC ........... E04B 1/98; E04H 9/02; E04H 9/0215; E04H 9/0235; E04H 9/0237; F16F 7/10

USPC .................................. 52/167.1, 167.3, 167.4
See application file for complete search history.

(56) References Cited

U.S. PATENT DOCUMENTS

| 4,328,648 | A | * | 5/1982 | Kalpins | E02D 27/34 |
| | | | | | 52/167.4 |
| 6,966,154 | B1 | * | 11/2005 | Bierwirth | E04H 9/02 |
| | | | | | 52/167.4 |
| 7,694,540 | B2 | | 4/2010 | Ishida et al. | |
| 10,024,378 | B2 | * | 7/2018 | Konitz | F16F 7/116 |
| 10,316,512 | B2 | * | 6/2019 | Dorsam | F03D 80/88 |
| 2017/0328058 | A1 | * | 11/2017 | Dorsam | F16F 7/116 |
| 2019/0284800 | A1 | * | 9/2019 | Cynober | E04H 9/0215 |
| 2019/0346003 | A1 | | 11/2019 | Dahl | |
| 2019/0360471 | A1 | * | 11/2019 | Ollgaard | F16F 7/10 |
| 2020/0355166 | A1 | * | 11/2020 | Mortensen | F16F 13/06 |

FOREIGN PATENT DOCUMENTS

| CN | 1284148 A | 2/2001 |
| CN | 1966879 A | 5/2007 |
| CN | 102 535 674 A | 7/2012 |

(Continued)

*Primary Examiner* — Thomas W Irvin
(74) *Attorney, Agent, or Firm* — BakerHostetler

(57) ABSTRACT

A spatial mass pendulum includes a pendulum mass and at least three, preferably four, pendulum rods. The pendulum rods are arranged distributed around the pendulum mass and are each coupled at a first coupling point to the object and at a second coupling point to a lower section of the pendulum mass. At least two pendulum rods are dimensioned and spread in such a way that the distance between their first coupling points is greater than the distance between their second coupling points, so that during a movement of the pendulum mass its center of gravity is guided by the pendulum rods on the surface of a virtual ellipsoid.

8 Claims, 7 Drawing Sheets

(56) References Cited

FOREIGN PATENT DOCUMENTS

| | | | |
|---|---|---|---|
| CN | 103437447 | A | 12/2013 |
| CN | 104141352 | A | 11/2014 |
| DE | 69118280 | T2 | 8/1996 |
| JP | 59-97342 | A | 6/1984 |
| JP | 63-254247 | A | 10/1988 |
| JP | 2-27070 | A | 1/1990 |
| JP | 4-4335 | A | 1/1992 |
| JP | 4-80477 | A | 3/1992 |
| JP | 4-108756 | U | 9/1992 |
| JP | 6-264960 | A | 9/1994 |
| JP | 11-29908 | A | 2/1999 |
| JP | 2001515160 | A | 9/2001 |
| JP | 2004-308314 | A | 11/2004 |
| JP | 2009235886 | A | 10/2009 |
| JP | 2015-199587 | A | 11/2015 |
| KR | 2014-0040881 | A | 4/2014 |
| WO | 92/02743 | A1 | 2/1992 |
| WO | 99/09278 | A1 | 2/1999 |

\* cited by examiner

COMPACT SPATIAL ELLIPSOIDAL MASS PENDULUM

CROSS-REFERENCE TO RELATED APPLICATIONS

This application is a National Stage of International patent application PCT/EP2017/080623, filed on Nov. 28, 2017, which claims priority to foreign German patent application No. DE 10 2016 122 999.7, filed on Nov. 29, 2016, the disclosures of which are incorporated by reference in their entirety.

FIELD OF THE INVENTION

The invention relates to a spatial mass pendulum. The invention also relates to an object provided with such a mass pendulum.

BACKGROUND

For quite some time now, large mass pendulums, which act as gravity pendulums in the gravitational field, have been used as oscillation absorbers for buildings. They serve to reduce the oscillations generated in particular by wind, wave movements, earthquakes, explosions, human influences (movement of people, etc.). For the building excited to oscillations, stresses result which lead to significant problems with regard to strength, stability, fatigue strength or safety and comfort of people present. Classic applications for mass pendulums in or on buildings include high-rise buildings, towers and pedestrian bridges. Mass pendulums can also be used in ships or other objects whose oscillations are undesirable and are to be reduced.

Different types of mass pendulums are known. In principle, each mass pendulum, irrespective of the specific embodiment, consists essentially of a mass (pendulum mass, oscillating mass) connected to an object in a suitable manner so that it can oscillate. The different designs differ in the way the mass is coupled to the object and in the way it is damped.

With regard to the damping of a mass pendulum in its application as an oscillation absorber, it is generally known to suspend a pendulum mass from the object to be protected so that it can oscillate and to arrange damping elements between the pendulum mass and the object. The period of oscillation of the mass pendulum is adjusted to the period of oscillation of the object to be damped. This is usually the lowest resonant frequency that is calculated from a modal analysis or measured on a real object. If the object is excited to oscillate, the mass pendulum undergoes a phase-shifted oscillation movement. The relative movement is damped by the damping elements and, thus, directed mechanical energy is extracted from the system and regularly dissipated into thermal energy. With suitable tuning, both the oscillation amplitude and the post-oscillation time of the object to be protected are significantly reduced.

With regard to the types of common mass pendulums, it is known that a pendulum mass is hinged to the object to be protected via approximately parallel pendulum rods. This arrangement creates a spherical pendulum in which the pendulum mass moves symmetrically on the surface of a sphere during the oscillation process. The oscillation period of the mass pendulum can be adjusted to any given oscillation period, for example to a resonance frequency of the object to which the pendulum is attached.

The oscillation period T (reciprocal value of the oscillation frequency f) of conventional gravity pendulums is decisively determined by the pendulum length $l_p$ according to the formula $$T = 2\pi \sqrt{\frac{l_p}{g}}$$

(g: gravitational acceleration of the earth). When used as a centrifugal pendulum in rotating objects, the centrifugal acceleration $a_{ZF}$ is used instead of the gravitational acceleration g. The amount of the pendulum mass $M_P$, its distribution (mass moments of inertia $I_x$, $I_y$) and the pendulum rods have only a very small influence, which is usually negligible for practical dimensioning.

In addition to the design as a common spherical pendulum, there are designs which arrange the pendulum mass in a folded double pendulum or guide a secondary mass coupled to the main mass on a horizontal plane or with a negative radius of curvature. The aim here is either to achieve the pendulum length required for a given period of oscillation (due to the proportionality of the period of oscillation to the root of the pendulum length, this length increases quadratically as the period of oscillation increases) at a significantly lower overall height, or to enable the two main axes to be tuned differently for objects oscillating asymmetrically about the main axes, e.g. high-rise buildings with asymmetrical ground plans.

Disadvantages of known mass pendulums are the very high construction heights due to long oscillation periods and consequently the loss of valuable construction volume. The alternatives mentioned require technically complex, cost-intensive designs, some of which use linear guide elements with increased friction, which lead to a poorer response behavior of the mass pendulum. Regular common spherical pendulums allow only one direction-independent period of oscillation, so that they are only suitable for symmetrically oscillating objects. In the case of executed objects, it often turns out that their calculated predicted oscillation periods were determined too long. For example, real stiffnesses of high-rise buildings are often greater with correspondingly shorter (actually measured) oscillation periods and require a significant shortening of the pendulum length during installation due to the square dependence. The buffer height initially planned in this context for subsequent adjustment is also not usable.

SUMMARY OF THE INVENTION

The object of the invention is to show an alternative solution for mass pendulums which avoids the aforementioned disadvantages. The mass pendulum to be developed for this purpose is to have a low overall height, be separately tunable in both horizontal main axes, be largely wear-free with good responsiveness, be effectively tunable to the planned oscillation periods with little change in geometry, and be cost-effective to implement.

This object is solved by a mass pendulum with the characteristics of claim 1. Preferred and expedient embodiments of the mass pendulum according to the invention are specified in the dependent claims.

The spatial mass pendulum according to the invention comprises a pendulum mass and at least three, preferably four, pendulum rods. The pendulum rods are arranged distributed around the pendulum mass and are each coupled to the object at a first coupling point and to a lower section of the pendulum mass at a second coupling point. At least two of the pendulum rods are dimensioned and spread such that the distance between their first coupling points is greater than the distance between their second coupling points, so that during a movement of the pendulum mass its center of gravity is guided by the pendulum rods on the surface of a virtual ellipsoid.

According to the invention, the pendulum mass is guided by a suitable construction of the basic type "spatial double inner swing arm" with at least three, normally four pendulum rods, which connect, regularly or irregularly distributed around the circumference, to the lower section of the pendulum mass. The center of gravity of the pendulum mass moves on the surface of an ellipsoid, whereby the differently selectable radii of curvature in the main axes (x- and y-direction) essentially determine the desired pendulum lengths and thus the oscillation periods in the direction of the two main axes. No other devices are provided for guiding or otherwise influencing the path of motion of the pendulum mass.

The spread of the pendulum rods according to the invention can be achieved in particular by an arrangement of pendulum rods of equal length with an angle not equal to 0° (non-parallel arrangement) and/or by the use of pendulum rods of unequal length and/or different coordinates of the respective first and/or second coupling points with respect to the vertical axis (z-direction).

The invention is fundamentally based on the realization that through a suitable design of a four-member link chain (coupling gear) a point in a plane can be guided linearly in a good approximation in a limited area. The underlying flat mechanics are based on the already mentioned symmetrical double inner swing arm with the subtype Roberts (Straight Line) Mechanism (known in German as "Roberts'scher Lenker"). With a suitably adapted geometry of the double inner swing arm, it is also possible to determine symmetry points of the oscillating coupling which move on defined circular paths whose radii—as for the applications required here—are significantly greater than the height of the mechanics of the coupling gear and whose centers thus lie outside the mechanics, i.e. above the mechanics in the present application of a pendulum. Based on this, very compact flat mass pendulums can be constructed.

In the present invention, the flat approach is also transferred to a spatial mechanics with at least three, normally four swinging arms (here pendulum rods). By adjusting the geometry parameters, the trajectories with defined radii of curvature (equal to pendulum lengths) of the pendulum mass center of gravity can be tuned separately for the x and y directions.

All mass pendulums are based on the physical effect of periodically converting the potential energy of the pendulum mass from a higher, laterally shifted point in the gravitational field (or centrifugal field) to the kinetic energy at the lowest point of the trajectory (resting point). In the simplified approach as a mathematical pendulum, point pendulum mass and massless pendulum rods are assumed. Thus only the kinetic energy of the translational motion of the pendulum mass is considered in the equation of motion. For conventional spherical pendulums, the deviations from the real oscillation period are negligible, since the pendulum mass only reaches a low angular velocity and thus the proportion of rotational energy in the total kinetic energy is low.

However, in the design as a spatial double inner swing arm according to the invention, the coupling and the connected pendulum mass reach significantly higher angular velocities, so that the percentage of rotational energy is higher and an adapted equation of motion for physical pendulums is used. Thus the period of oscillation can be extended by larger mass moments of inertia of the pendulum mass with unchanged geometry of the suspension.

The center of gravity of the pendulum mass should be above the second coupling points so that the reduction in the pendulum height achievable with the invention can be exploited to the full.

The pendulum mass forms an integral part of the mechanics of the mass pendulum and can itself take over the function of the coupling element. This means that the pendulum rods are directly coupled to the pendulum mass by means of suitable joints. Alternatively, a separate coupling element can be provided, in particular a plate on which the pendulum mass is fixed. In this case, the coupling of the pendulum rods to the pendulum mass is realized via the coupling element.

In accordance with a preferred embodiment of the invention, the pendulum rods are arranged in such a way that the oscillation periods of the mass pendulum in the two main horizontal directions can be adjusted independently of each other. Herein at least one pendulum rod forms a first spread with a first pendulum rod adjacent to the at least one pendulum rod in the horizontal circumferential direction of the pendulum mass and a second spread with another second pendulum rod adjacent to the at least one pendulum rod in the horizontal circumferential direction of the pendulum mass, the second spread being different from the first spread. The period of oscillation (and thus the oscillation frequency) of the mass pendulum, with the construction according to the invention, is determined in one direction by the effective spreading of the pendulum rods in this direction (in addition to the system height $h_z$), so that different spreads in different directions lead to different periods of oscillation in these directions.

In addition, the mass pendulum can be designed to carry out torsional oscillations about a vertical axis. The described mass pendulum also has a rotational degree of freedom around the z-axis and can be tuned to the torsional oscillation around this vertical axis (yaw axis), which corresponds to the symmetry axis of the pendulum mass, and damped if necessary.

The object of the invention is also solved by an oscillating or non-oscillating object provided with a mass pendulum of the type described above.

A non-oscillating object is to be understood as a structure that serves as a carrier for the mass pendulum, wherein the main goal is not the damping of oscillations of this object, however. Rather, the invention in this case aims at an independently tunable pendulum in order to develop rides or detectors with corresponding trajectories.

One of the main applications of the invention is, however, the use of the mass pendulum as an oscillation absorber, as explained above. For this application, the invention provides for an oscillating object, for example a building, which is provided with a mass pendulum according to the invention and at least one damper element. The damper element is coupled directly or indirectly to the pendulum mass on the one hand and directly or indirectly to the object to be damped on the other hand.

BRIEF DESCRIPTION OF THE DRAWINGS

Further characteristics and advantages of the invention result from the following description and from the attached drawings to which reference is made, wherein.

DETAILED DESCRIPTION

All geometric considerations are based on a Cartesian coordinate system in which x- and y-axes perpendicular to each other span a horizontal plane and a z-axis perpendicular to the plane represents the vertical axis.

Figure 1:
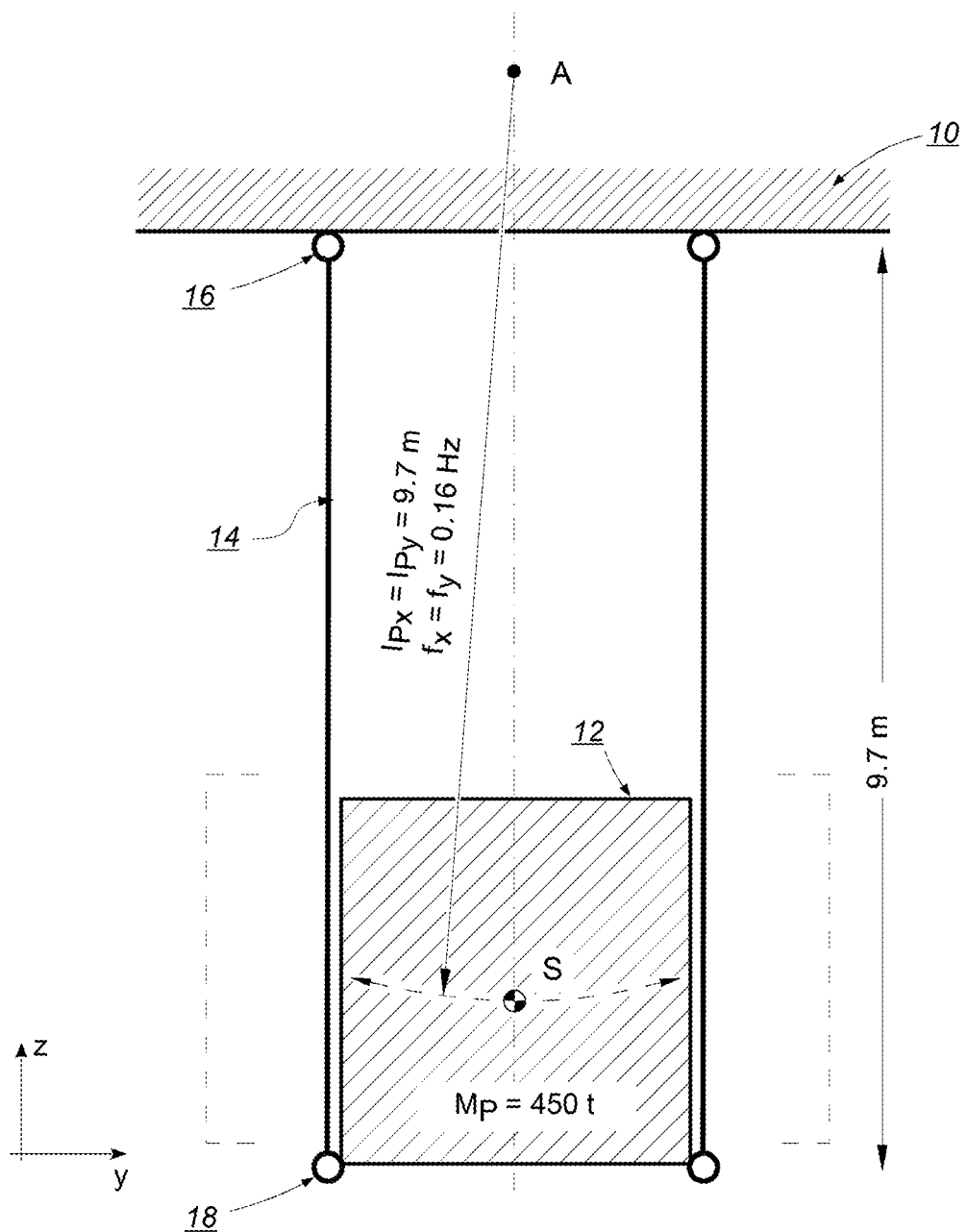
FIG. 1 is a side view of a classic spherical pendulum with dimensions.
Figure 2:
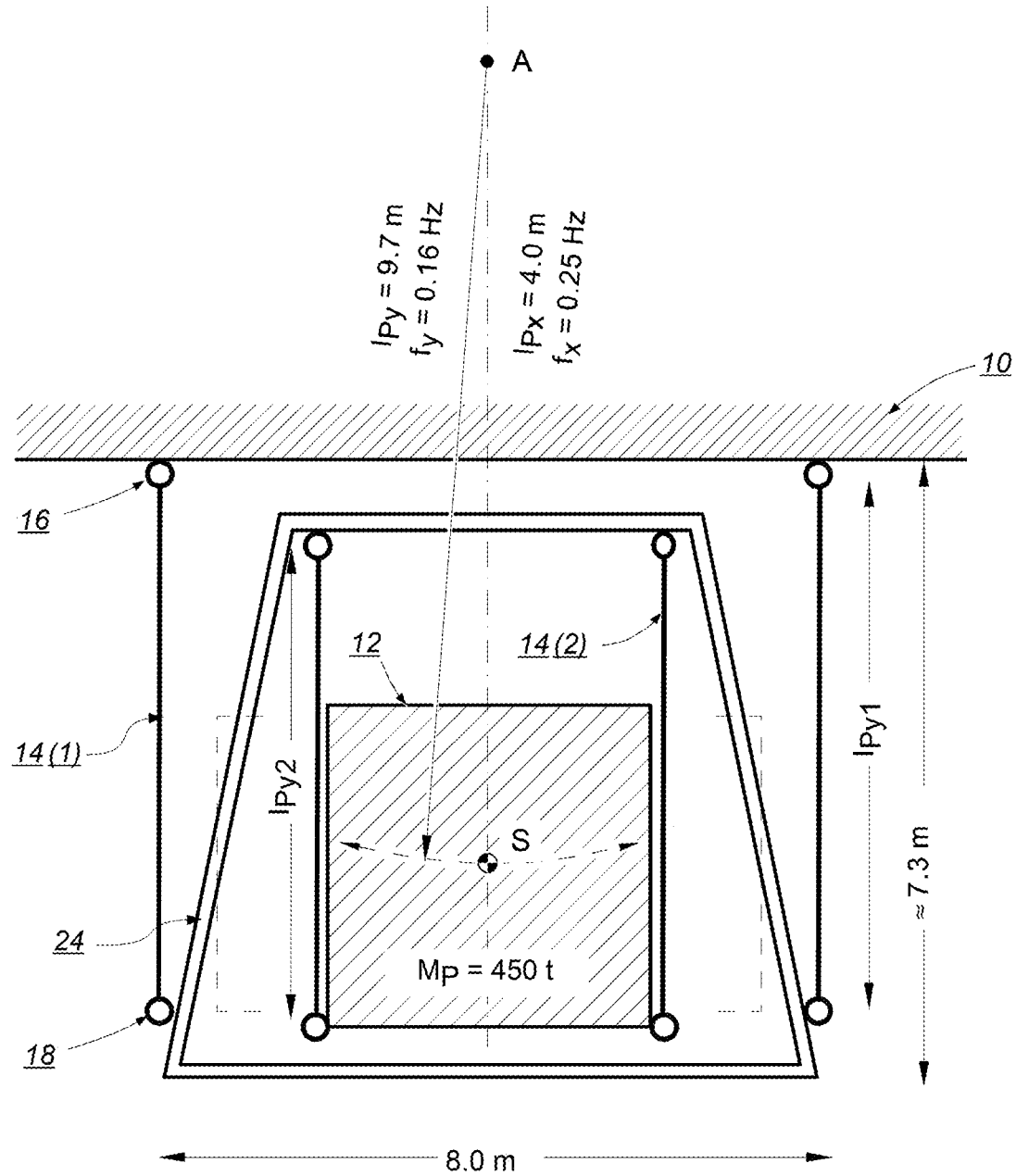
FIG. 2 is a side view of a real double pendulum with dimensions.

In order to explain the invention, FIGS. 1, 2 and 4 are used to describe three exemplary pendulums based on different constructions, all of which are or would be suitable as oscillation absorbers for a real object. For the 209 m high (z-direction) building, which is designed for wind speeds of up to 190 km/h and earthquakes of up to 9 Richter magnitude, a pendulum mass of 450 tons is required. Due to its asymmetrical ground plan, the building has different horizontal resonance frequencies of $f_x=0.25$ Hz in the x-direction and $f_y=0.16$ Hz in the y-direction.

A classical spherical pendulum, as shown in FIG. 1, could be used as an oscillation absorber for this building in the y-direction. A pendulum mass 12 with $M_P=450$ t is suspended from four pendulum rods 14 on an object 10, here on a ceiling in the uppermost area of the building in question. Of the four pendulum rods 14, only two can be seen in the side view of FIG. 1. The pendulum rods 14 are distributed over the outer circumference of the pendulum mass. Each of the pendulum rods 14 is coupled, on the one hand, to a point in the lower section of pendulum mass 12 and, on the other hand, to a point in a downwardly open region of the object 10, so that the pendulum mass 12 is freely suspended in the resting state from the four approximately parallel pendulum rods, i.e. the coupling points permit an essentially unrestricted deflection of the pendulum mass 12 in all possible directions of movement.

In order to achieve a resonance frequency of the pendulum mass 12 of $f_y=0.16$ Hz for the pendulum shown in FIG. 1, a pendulum length $l_p$ of 9.7 m is required according to the formula mentioned above. The pendulum length $l_p$ ranges from the center of gravity S (center of mass) of the pendulum mass 12 to the virtual suspension point A of the pendulum mass 12, which corresponds to the center of the virtual sphere surface defined by the arrangement of the pendulum rods 14, on which the center of gravity of the pendulum mass 12 can move.

Due to the limited space at the top of the building and the different oscillation frequencies in x- and y-direction, a double pendulum with divided pendulum rods, as shown in FIG. 2, was used instead of a classical spherical pendulum. A frame construction 24 is suspended from four pendulum rods 14(1), in which the pendulum mass 12 with $M_P=450$ t is suspended by means of four further pendulum rods 14(2). In x-direction the movement of the pendulum rods 14(2) is prevented by linear guides, so that different pendulum lengths and oscillation frequencies result in x- and y-direction. Of the pendulum rods 14(1) and 14(2) only two rods, respectively, can be seen in the side view of FIG. 2.

With this construction, the overall height of the pendulum can already be significantly reduced, since the virtual suspension point A is moved further upwards. The pendulum length of $l_{Py}=9.7$ m for an oscillation with $f_y=0.16$ Hz is here compared with an overall height of only 7.3 m. However, due to the elaborate design as a double pendulum, the result for the overall system is a weight of 570 t with external dimensions of 8.0 m×8.0 m×7.3 m, in particular due to the plurality of pendulum rods and the frame construction 24.

FIG. 4 shows a mass pendulum according to the invention, which is equivalent to the double pendulum according to FIG. 2 with regard to the required function and is described in more detail below. For a better understanding, reference is also made here to the schematic perspective view of a mass pendulum according to the invention, in which certain components are better recognizable.

Figure 3:
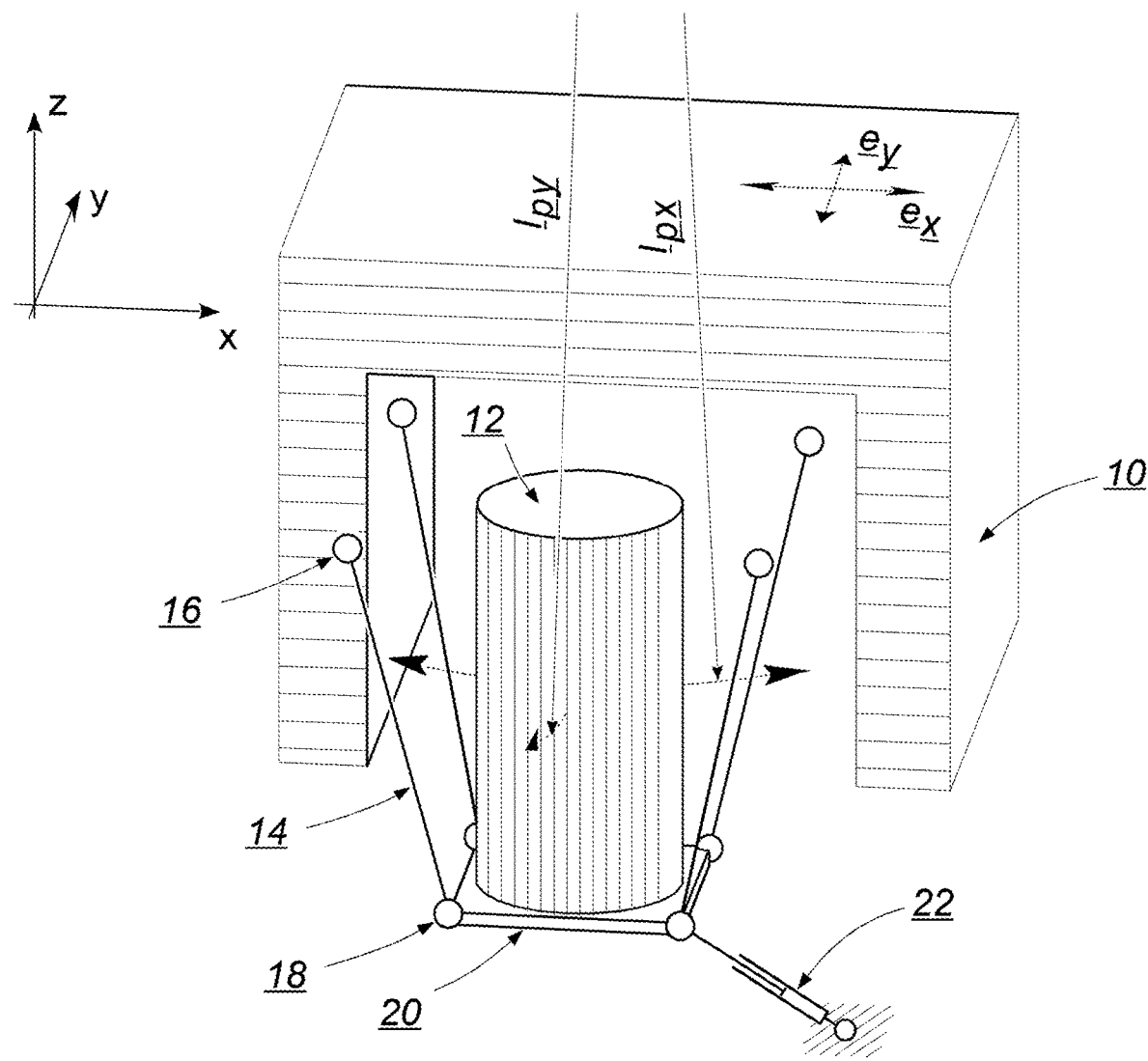
FIG. 3 is a perspective view of a mass pendulum according to the invention with four pendulum rods.
Figure 4B:
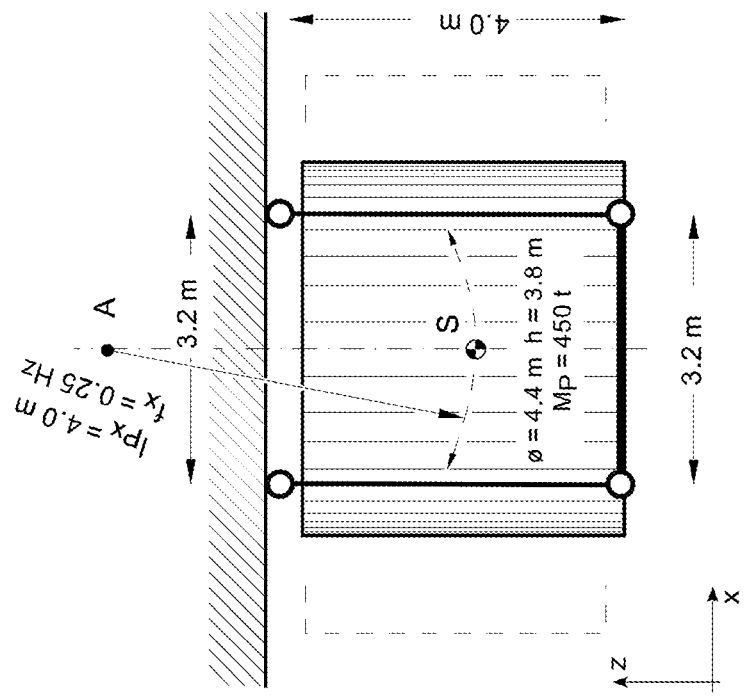
FIG. 4b is a second side view rotated by 90 degrees of the mass pendulum of FIG. 4a with dimensions.
Figure 4A:
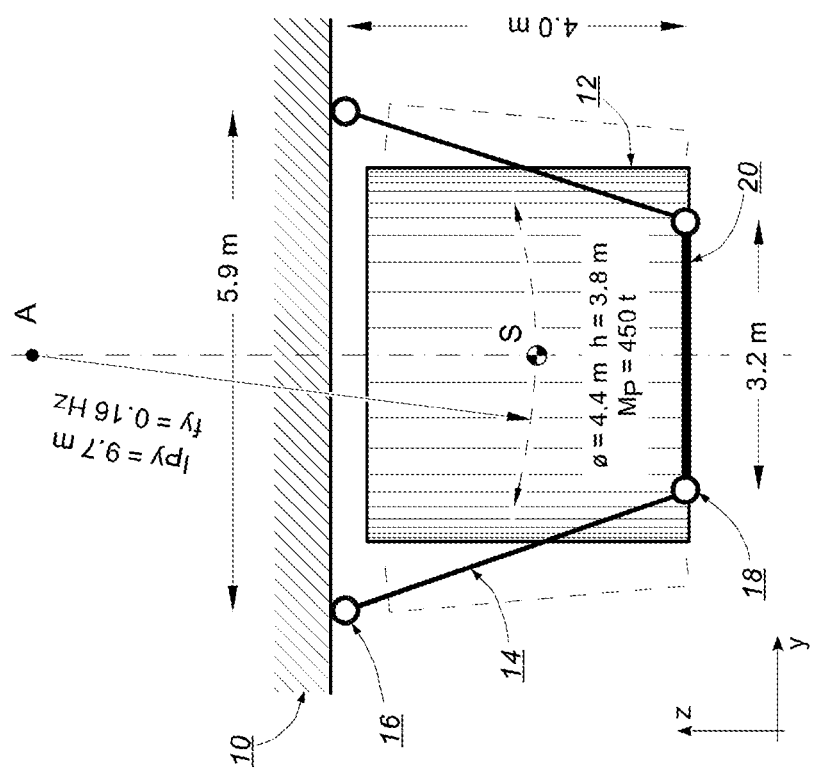
FIG. 4a is a first side view of a mass pendulum according to the invention with dimensions.

The pendulum mass 12 with $M_P=450$ t consists of a standing steel cylinder with 4.4 m diameter and 3.8 m height. The pendulum mass 12 is suspended with four pendulum rods 14 on the object 10, here on the ceiling of the building. The upper ends of the pendulum rods 14 are freely rotatably coupled to the building ceiling at first coupling points by means of joint bearings 16, while the lower ends of the pendulum rods 14 are freely rotatably coupled to lower coupling points by means of joint bearings 18, either to a coupling element 20 in the form of a plate or the like, as shown in FIG. 3, on which the pendulum mass 12 is fixed upright, or, as shown in FIGS. 4a and 4b, directly to the pendulum mass 12 in its lower section. In the first case, the mass of the coupling element 20 shall be regarded as part of the pendulum mass 12. In any case, the center of gravity S of the pendulum mass 12 is above the lower coupling points.

The four pendulum rods 14 are arranged distributed over the circumference of the pendulum mass 12, wherein the pendulum rods can have equal or unequal distances from each other in the circumferential direction.

One or more damper elements 22 are arranged between the mass pendulum and the object 10. The damper elements 22 can engage directly on the pendulum mass 12 or, as shown in FIG. 3, on the coupling element 20.

In the x-direction, the higher oscillation frequency of $f_x=0.25$ Hz compared to the y-direction can be achieved with vertically arranged 4.0 m long pendulum rods 14 (see FIG. 4b). For the lower oscillation frequency of 0.16 Hz in the y-direction, the pendulum rods 14 are spread from 3.2 m to 5.9 m and attached to the ceiling of the building. This means that the lower coupling points of the pendulum rods 14 have a distance of 3.2 m in the y-direction, while the distance between the upper coupling points in the same direction is 5.9 m (see FIG. 4a).

This special suspension results in a physical pendulum length of 9.7 m for the oscillations in the y-direction, although the height of the overall system is once again significantly reduced compared to the double pendulum shown in FIG. 2. To be more precise, the pendulum according to FIG. 4 requires only a gross installation space of approx. 6.0 m×6.0 m×4.5 m (including free space for the oscillation movements and installation space for the coupling elements).

Figure 5:
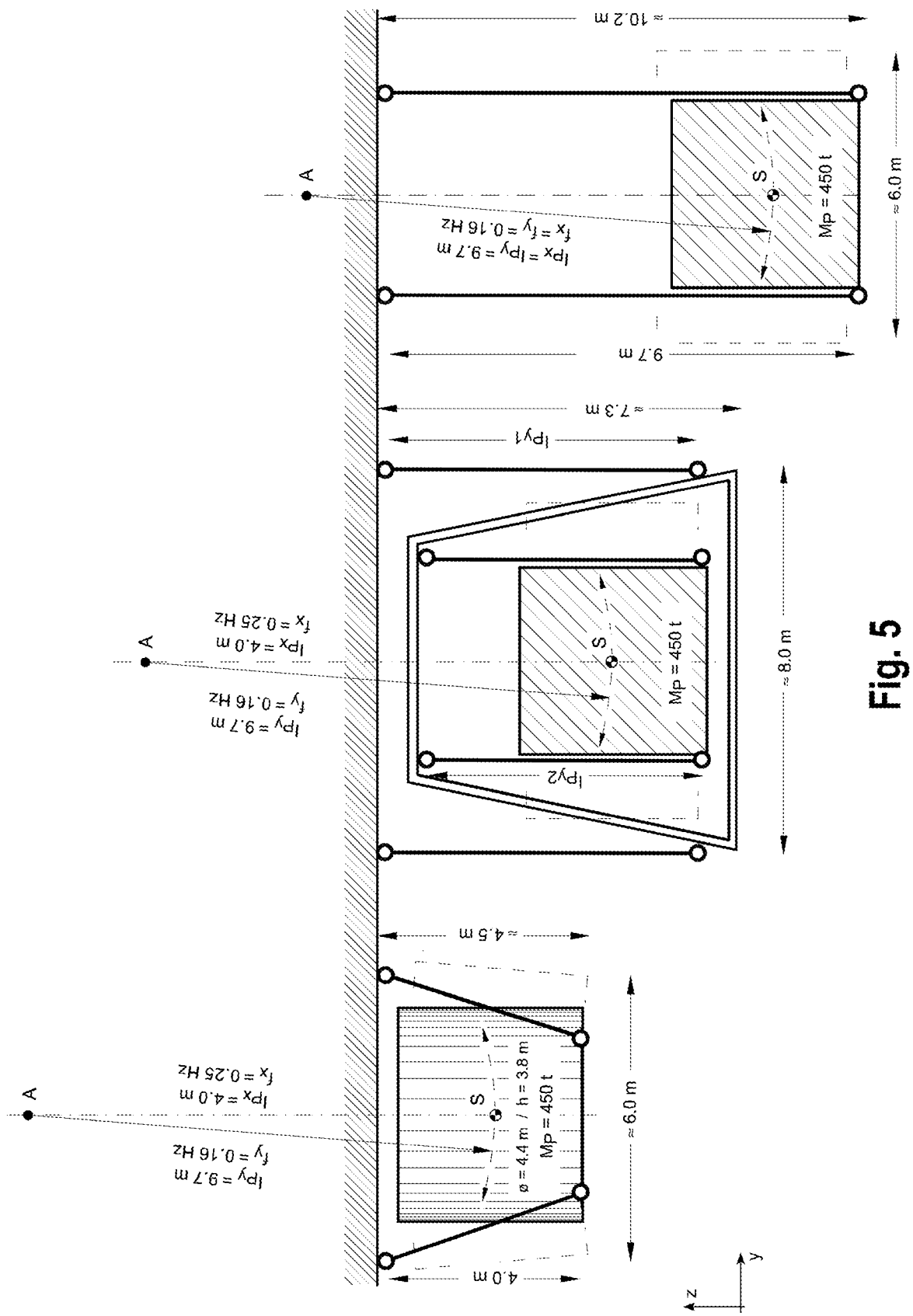
FIG. 5 is a size comparison between the pendulums from FIGS. 1, 2 and 4a, 4b.

In FIG. 5, the pendulums shown in FIGS. 1, 2 and 4 are shown again from right to left in a side-by-side arrangement to illustrate the proportions. In particular, the construction height of only 4.5 m of the pendulum according to the invention is considerably lower than the regular required pendulum length in the y-direction of the classical spherical pendulum of approx. 10.2 m as well as that of the double pendulum of 7.3 m.

Figure 6B:
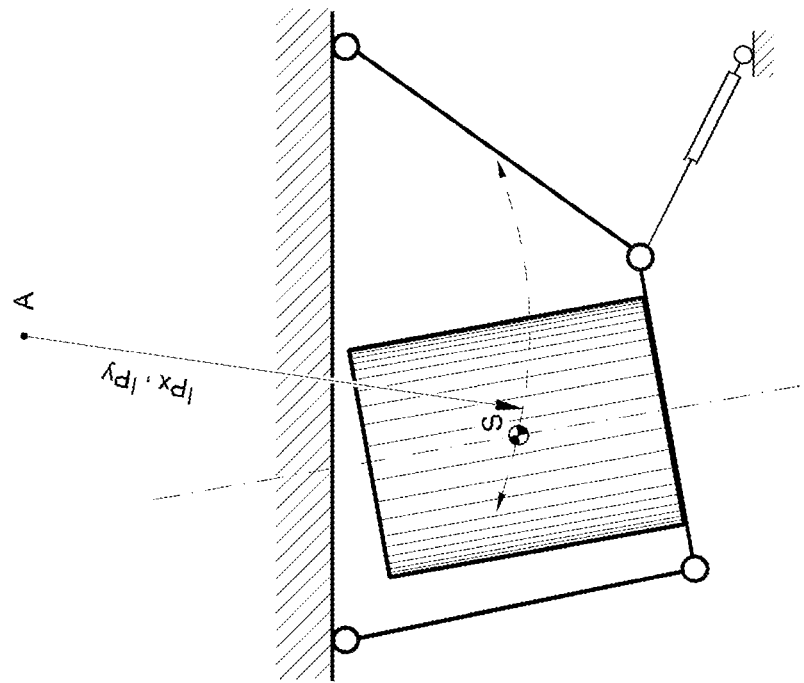
FIG. 6b is a side view of the mass pendulum of FIG. 6a in deflected position.
Figure 6A:
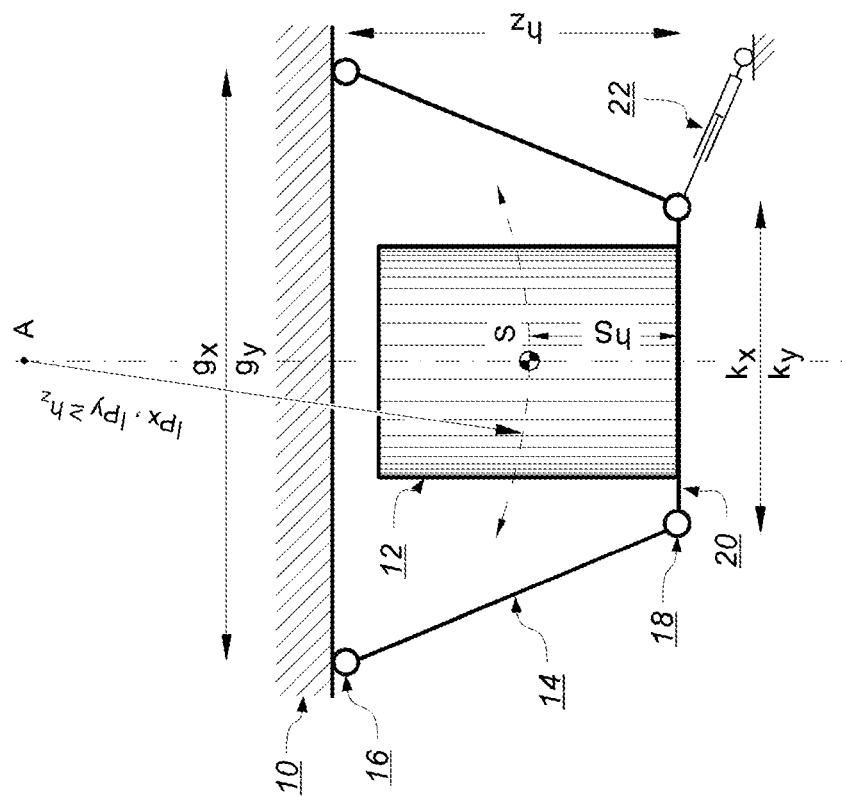
FIG. 6a is a side view of a mass pendulum according to the invention in resting position.

FIGS. 6a and 6b show the generalized suspension of the pendulum mass 12 with spread pendulum rods 14 (rest position in FIG. 6a) and the resulting oscillation (deflected position in FIG. 6b) in a plane in x-direction or y-direction. The center of gravity S of the pendulum mass 12 moves on a circular trajectory in each plane. Altogether the center of gravity S can, therefore, move on the surface of a virtual ellipsoid, which is determined by two main axes (x- and y-axis), which in turn correspond to the pendulum lengths $l_{Px}$, $l_{Py}$ in x- and y-direction. The two pendulum lengths $l_{Px}$, $l_{Py}$ can be selected to different sizes by means of the corresponding system height $h_z$ and spreads of the pendulum rods 14. This means that the oscillation periods of the mass pendulum in the two main directions, which are largely dependent on the pendulum lengths, can be tuned separately.

Figure 7:
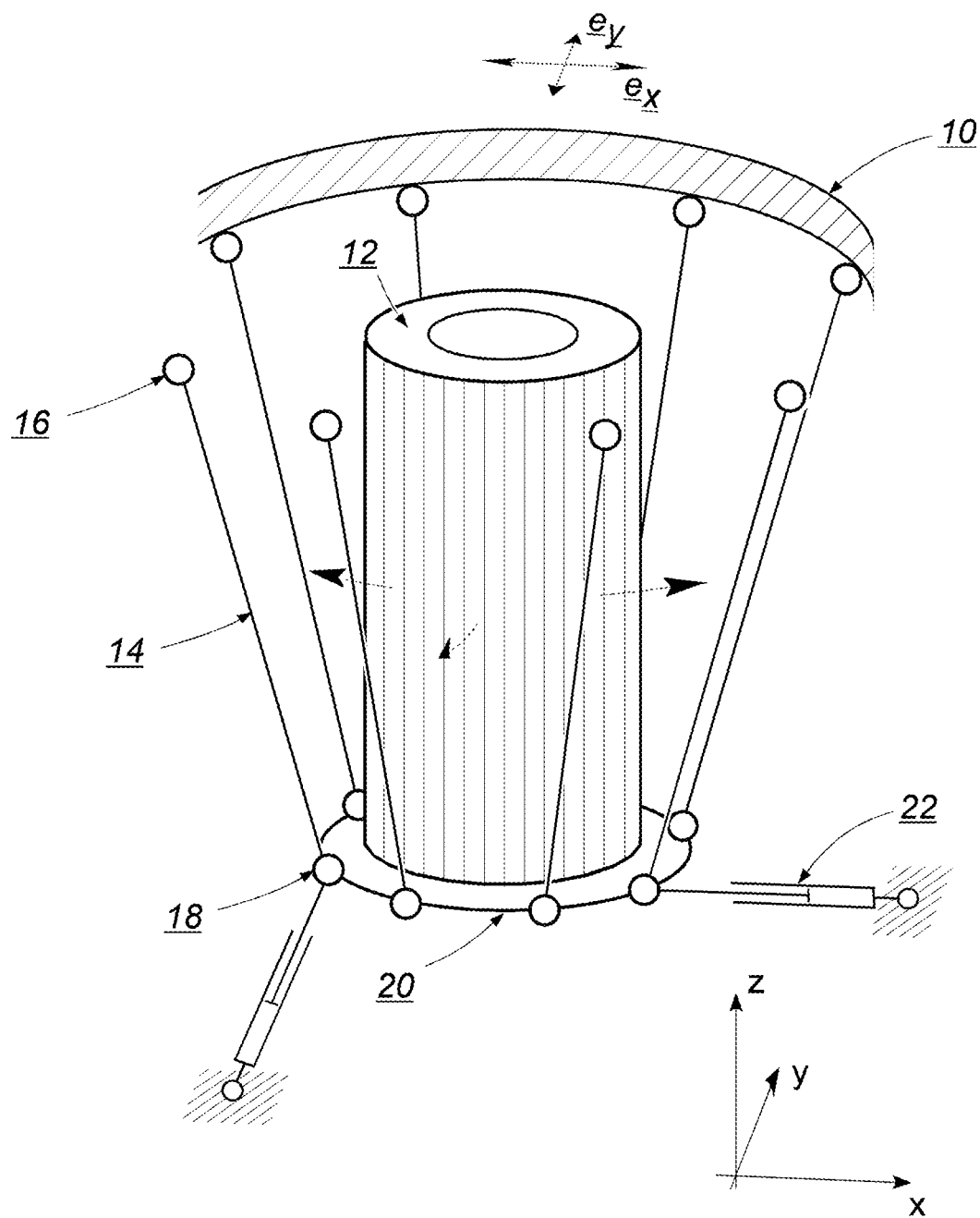
FIG. 7 is a perspective view of a symmetrical mass pendulum according to the invention with eight pendulum rods.

FIG. 7 exemplary shows another embodiment of a mass pendulum in symmetrical design with a plurality of pendulum rods 14, in this case eight pendulum rods 14. In this design, all pendulum rods 14 are arranged spread apart relative to each other, i.e. the distance between any two pendulum rods 14 is smaller at their lower coupling points than at the upper coupling points. By way of comparison, for the design shown in FIGS. 4a and 4b, this applies only to the pendulum rods 14 adjacent in one of the two main horizontal directions (y-direction, see FIG. 4a), while the pendulum rods 14 adjacent in the other main direction (x-direction, see FIG. 4b) have substantially equal distances between the upper and lower coupling points.

It follows from the above that the invention is of course not limited to the embodiment described above. The expert generally realizes that, based on the novel design, desired oscillation frequencies can be achieved with a given pendulum mass by a suitable spread arrangement of the pendulum rods, if necessary also different frequencies in the two main directions, wherein the pendulum height can be substantially reduced compared to known designs. In principle, at least three pendulum rods are required for this, but four should normally be used, more pendulum rods may be used if necessary.

As an oscillating object 10, whose oscillations are to be damped, ships, offshore installations, oscillating or rotating machine parts such as rotors and rotor blades and any other structures can also be considered in addition to buildings such as high-rise buildings, towers, bridges, etc.

The invention can also be used as an independently tunable pendulum, without coupling to an oscillating object, to develop rides or detectors, for example. The compact adjustable kinematics can be used in the simplest case to guide a point on the surface of an ellipsoid.

The respective pendulum rods 14 can be designed as rigid elements with suitable first and second joint bearings 16, 18 or as functionally equivalent flexible tension links such as ropes, belts, chains, tensioning elements or the like, which permit rotation at the coupling points.

REFERENCE NUMERALS 10 object
12 pendulum mass
14 pendulum rods
16 first (upper) coupling point (joint bearing)
18 second (lower) coupling point (joint bearing)
20 coupling element
22 damper elements
24 frame construction

The invention claimed is:

1. An oscillation absorber for an object to be protected in the manner of a spatial mass pendulum with a pendulum mass, at least three, pendulum rods which are arranged distributed around the pendulum mass and are each coupled at a first coupling point to an object and at a second coupling point to a lower section of the pendulum mass, wherein at least two pendulum rods are dimensioned and spread such that the distance between their first coupling points is greater than the distance between their second coupling points, so that during a movement of the pendulum mass its center of gravity is guided by the pendulum rods on the surface of a virtual ellipsoid and wherein the pendulum rods are arranged in such a way that the oscillation periods of the oscillation absorber in the two main horizontal directions can be adjusted independently of each other.

2. The oscillation absorber according to claim 1, wherein the center of gravity of the pendulum mass is located above the second coupling points.

3. The oscillation absorber according to claim 1, wherein the pendulum mass is fixed on a coupling element, in particular a plate, and the coupling of the pendulum rods to the pendulum mass is realized via the coupling element.

4. The oscillation absorber according to claim 1, wherein at least one pendulum rod forms a first spread with a first pendulum rod adjacent to the at least one pendulum rod in the horizontal circumferential direction of the pendulum mass and a second spread with another second pendulum rod adjacent to the at least one pendulum rod in the horizontal circumferential direction of the pendulum mass, the second spread being different from the first spread.

5. The oscillation absorber according to claim 1, wherein the mass pendulum is designed to carry out torsional oscillations about a vertical axis.

6. An oscillating or non-oscillating object provided with a oscillation absorber according to claim 1.

7. The oscillating object provided with the oscillation absorber according to claim 1, and at least one damper element which is coupled on the one hand directly or indirectly to the pendulum mass and on the other hand directly or indirectly to the object.

8. The oscillating absorber according to claim 1, having four pendulum rods.

* * * * *